US008427028B2

(12) United States Patent
Clemente

(10) Patent No.: US 8,427,028 B2
(45) Date of Patent: Apr. 23, 2013

(54) COMPACT BRUSH HOLDER ASSEMBLY HAVING DYNAMIC LOADING AND IMPROVED BRUSH BOX HOLDER

(76) Inventor: Roger Clemente, Hazlet, NJ (US)

( * ) Notice: Subject to any disclaimer, the term of this patent is extended or adjusted under 35 U.S.C. 154(b) by 337 days.

(21) Appl. No.: 12/799,248

(22) Filed: Apr. 22, 2010

(65) Prior Publication Data

US 2010/0277033 A1 Nov. 4, 2010

Related U.S. Application Data

(60) Provisional application No. 61/215,097, filed on May 4, 2009.

(51) Int. Cl.
*H02K 13/00* (2006.01)

(52) U.S. Cl.
USPC ............ 310/242; 310/239; 310/241; 310/244

(58) Field of Classification Search .................. 310/229, 310/238–242, 244–245
See application file for complete search history.

(56) References Cited

U.S. PATENT DOCUMENTS 3,136,967 A * 6/1964 Snowdon et al. ............. 336/149
5,977,682 A * 11/1999 Clemente ...................... 310/239

FOREIGN PATENT DOCUMENTS

DE 102007046302 A1 * 4/2009
JP 62296746 A * 12/1987

OTHER PUBLICATIONS

Machine Translation DE102007046302 (2009).*

* cited by examiner

*Primary Examiner* — Tran N. Nguyen
*Assistant Examiner* — Jose Gonzalez Quinones
(74) *Attorney, Agent, or Firm* — Clifford G. Frayne

(57) ABSTRACT

These and other objects of the present invention are achieved by a brush holder assembly for an electric motor or generator wherein the brush box or holder is arcuate and curved in relationship to a commutator and supports a brush means and a floating constant force spring which allows dynamic movement and control of the brush as it moves towards a commutator.

10 Claims, 5 Drawing Sheets

COMPACT BRUSH HOLDER ASSEMBLY HAVING DYNAMIC LOADING AND IMPROVED BRUSH BOX HOLDER

RELATED APPLICATIONS

Applicant claims the benefit of provisional application Ser. No. 61/215,097, filed May 4, 2009.

BACKGROUND OF THE INVENTION

1. Field of the Invention

The invention relates to electric machines, and more particularly, to a brush holder assembly for an electric motor.

2. Description of the Prior Art

Brush holder assemblies which control the movement of the brush against the commutator having a critical affect on overall motor performance. There are numerous designs which are currently used by motor manufacturers including assemblies which use constant force springs to control brush movement against the commutator. Some assemblies limit brush loading to the front, while others can be loaded from the back. On the latter, the constant force spring must be removed to install a new brush. Both designs limit brush movement, resist brush cooling, require complicated brush holder designs, and necessitate substantial space for installation. Previously assemblies restrict how the constant-force spring is held in place because the spring manufacturers recommendations limit the approved method to return the constant-force spring to the outside portion of the coiled sections. There is a need for an improved compact brush holder assembly to hold the inside coil sections of the constant-force spring which do not interfere with brush loading. See Applicant's prior U.S. Pat. Nos. 5,977,682 and 5,905,323.

OBJECTS OF THE INVENTION

An object of the present invention is to provide for a novel brush box holder assembly in which the brush box has minimal contact with the brush thereby reducing friction and binding.

A further object of the present invention is to provide for a novel brush box holder assembly which could easily be stamped out of metal.

A still further object of the present invention is to provide for a novel brush box holder assembly in which the brush box is arcuately curved in relationship to the commutator having side wall members that can be a concave shape, convex shape, or a combination of both to form an S shape.

A still further object of the present invention is to provide for a novel brush box holder assembly which provides increased brush travel while improving brush alignment with the commutator.

A still further object of the present invention is to provide for a novel brush box holder assembly which will allow the brush to respond more quickly to radial and axial loads.

A still further object of the present invention is to provide for a novel brush box assembly which reduces motor noise and improves commutation by allowing the brush to float and thus having a smoother contact with the commutator.

A still further object of the present invention is to provide for a novel brush box holder assembly, the construction of which reduces brush temperature during operation.

A still further object of the present invention is to provide for a novel brush box holder assembly which can be installed in a smaller volumetric footprint.

A still further object of the present invention is to provide for a novel brush box holder assembly wherein the brush box may be fabricated from tubing, thus further optimizing the benefits described hereinabove.

SUMMARY OF THE INVENTION

These and other objects of the present invention are achieved by a brush holder assembly for an electric motor or generator wherein the brush box is arcuately curved in relationship to the commutator and supports a brush means and a floating constant force spring which allows dynamic movement and control of the brush as it moves towards a commutator.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
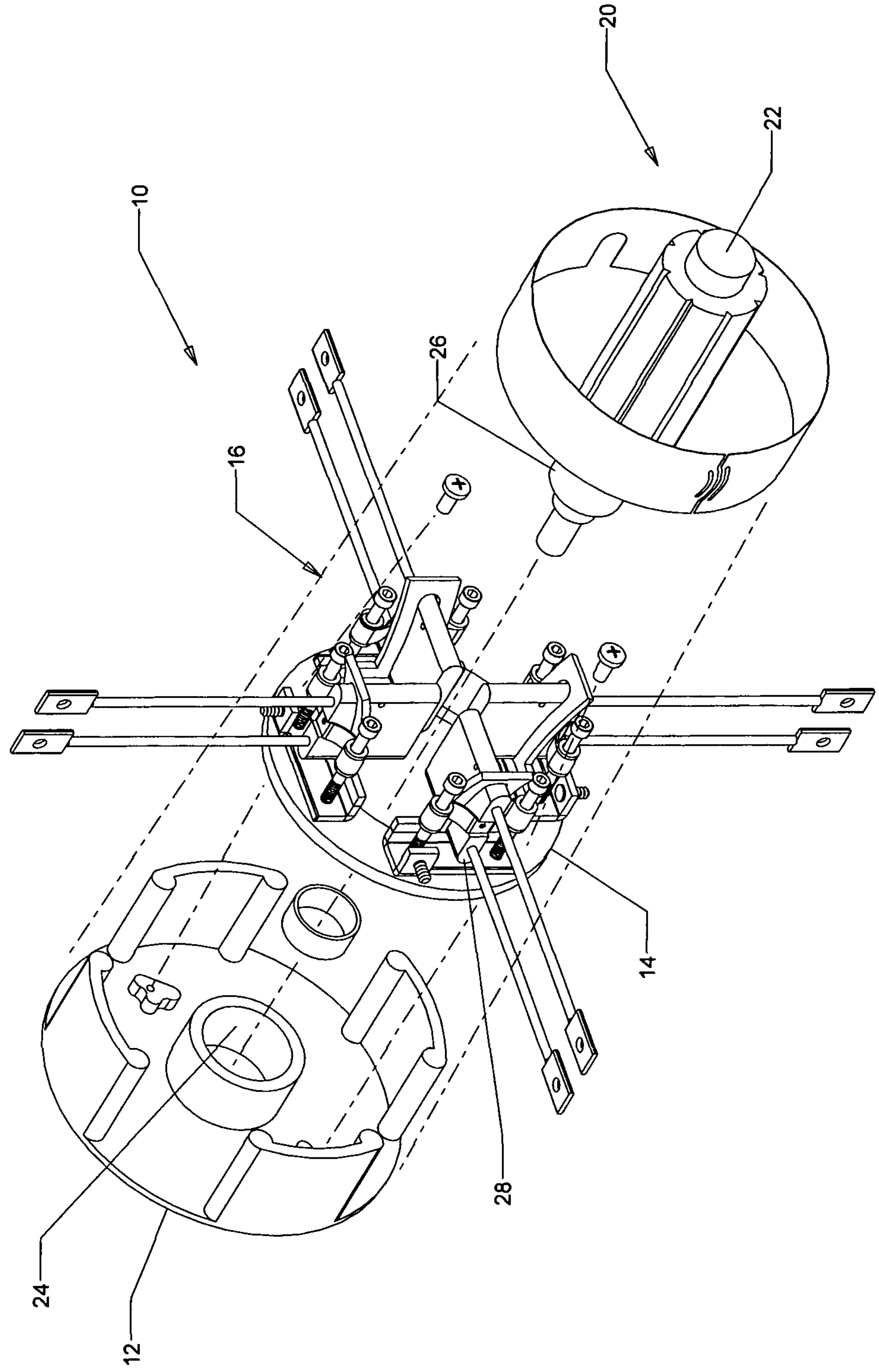
FIG. 1 is a partial fragmentary, isometric view of a portion of a dynamoelectric machine illustrating a brush and brush holder assembly.
Figure 2:
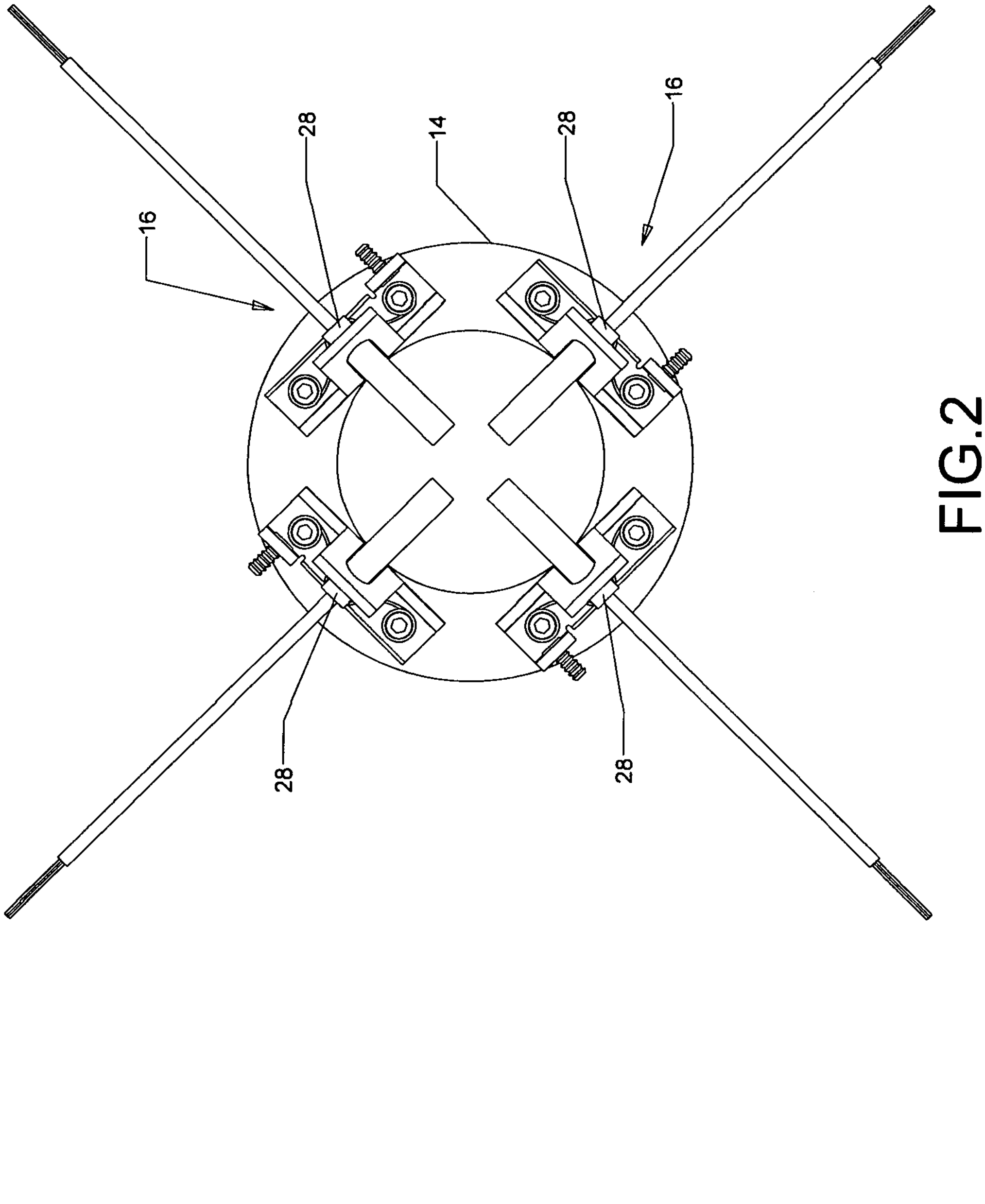
FIG. 2 is a top elevational view of the yolk of the dynamoelectric machine of FIG. 1.

Referring now to the drawings, and particularly FIGS. 1 and 2, there is illustrated a dynamoelectric machine generally indicated as 10. The dynamoelectric machine 10 may be a conventional DC motor having a tubular frame (not shown) and a cover or end frame 12, attached to an open end of the tubular frame such as by bolts (not shown) in a conventional manner. An insulated support or yolk member 14 is provided with a plurality of brush and brush holder assemblies, generally indicated as 16, disposed equidistantly and radially on the yolk 14. The yolk 14 is fastened to the end frame 12 of the machine 10 in a manner known to one skilled in the art. The yolk 14 is preferably fabricated from a thermoplastic dielectric material and is formed with orifices to provide for the mounting of such brush holder assembly 16, as well as to provide mounting of the yolk 14 to the end frame 12 of the machine 10.

Interiorly of the tubular frame of the machine 10 there is provided an armature or rotor, generally indicated as 20, rotatably positioned within a field structure (not shown). Such field structure is conventional and may include permanent magnetic field or include windings connected to terminally posts leading to the exterior of the housing in a manner known to one skilled in the art. The armature 20 is provided with a shaft 22 journaled for rotation within a recessed portion or cavity 24 formed in the end frame 12. A thrust washer (not shown) may be provided between a bearing and the rotor 20. The shaft 22 of the armature 20 is provided with a commutator 26 formed with a peripheral surface which cooperates with equidistantly radially extended brushes 28 mounted on yolk 14 and slidably mounted in a respective brush holder assembly 16 as more fully hereinafter discussed.

Figure 3:
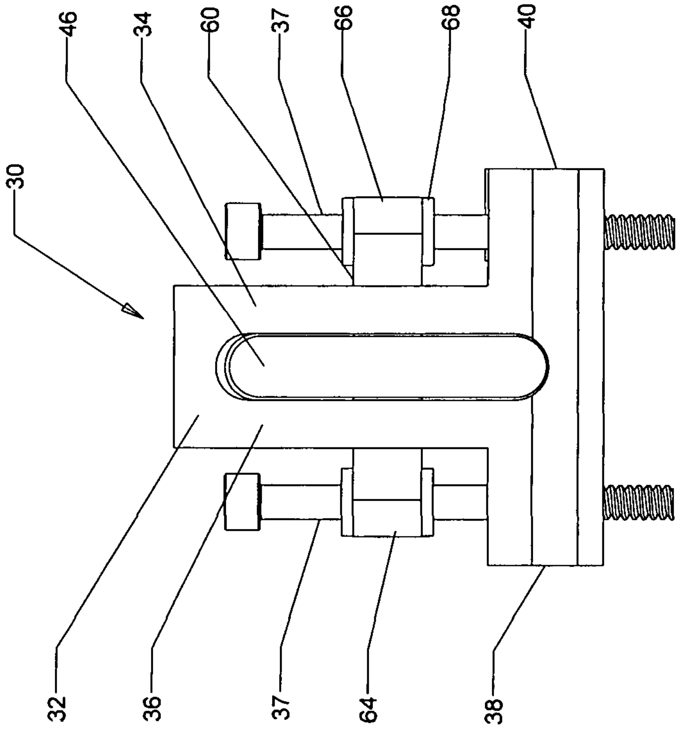
FIG. 3 is a front view of the brush and brush holder assembly of the present invention.
Figure 4:
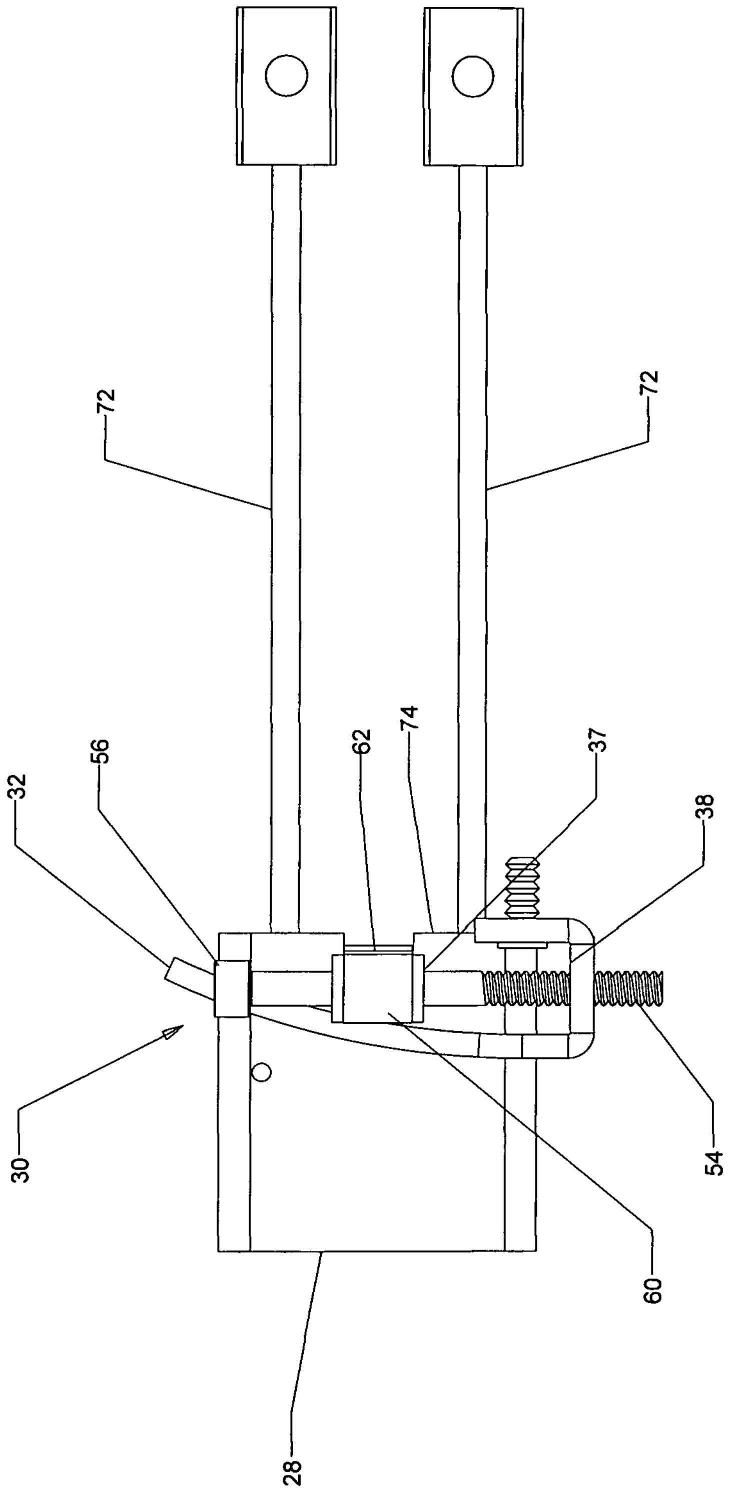
FIG. 4 is a side view of one embodiment of the brush and brush holder assembly of the present invention.

The brush holder assembly 16 of the present invention, referring now to FIGS. 3 and 4, is comprised of a preferred generally U-shaped elongated housing member 30, including an upper and lower U-shaped end wall portion 32, parallelly-disposed side wall portions 34 and 36 and outwardly extending leg portions 38 and 40 perpendicularly disposed to the side wall portions 34 and 36 respectively. The elongated housing member 30 is radially mounted, such as by nuts and bolts 37 to the yolk 14, defining a chamber 46. Housing member 30 with cuvalinear side wall portion 32 is arcuate with respect to commutator 26, and curves toward commutator 26.

An elongated pin member 54 having an upper top head 56 is mounted on both sides of the housing 30 parallelly-disposed to the housing member 30. Each pin member 54 is mounted within orifices (not shown) in the leg portions 38 and 40 of each side wall member.

A spring member 60 of constant tension force having a main body position 62 and end coil portions 64 and 66 with each coil portion mounted on a plastic cylindrically-shaped bushing member 68. The elongated top and bottom U-shaped armature brush member 28 including conductors 72 is positioned within the chamber 46 defined by the housing member 30 and the yoke 14 wherein the main body portion 62 of the spring member 60 is biased against an end portion 74 of the brush member 28.

In assembly, the elongated and U-shaped brush member 28 is introduced into the chamber 46 through the front opening of the housing member 30 and inserted against the main body portion 62 of the coil spring member 60 to a point where the brush member 28 is fully inserted within the housing chamber 46. After mounting the brush and brush holder assemblies on the yolk 14 and positioning of the yolk 14 in the motor assembly 10 with armature 20 suitable positioned therein, the brush member 28 thereby to caused to contact the commutator 26 of the armature 20 under the biased spring force of the spring member 60.

Alternately, the brush member 28 may be positioned within the chamber 46 of the housing member 30 by causing the main body 62 if the spring member 60 to be pulled backwards to a point permitting positioning of the brush member 28 at an opening in the rear portion of the housing member 30.

Figure 6:
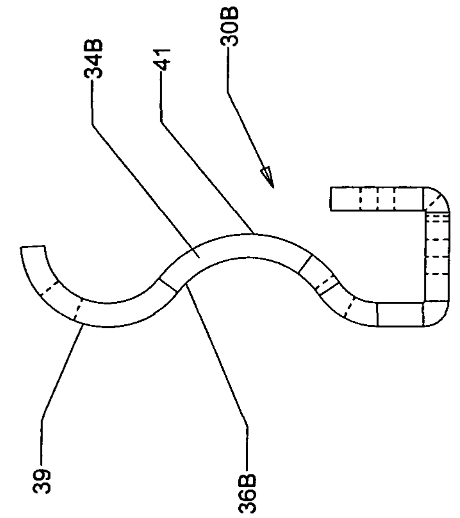
FIG. 6 is a side view of a third embodiment of the brush holder.
Figure 5:
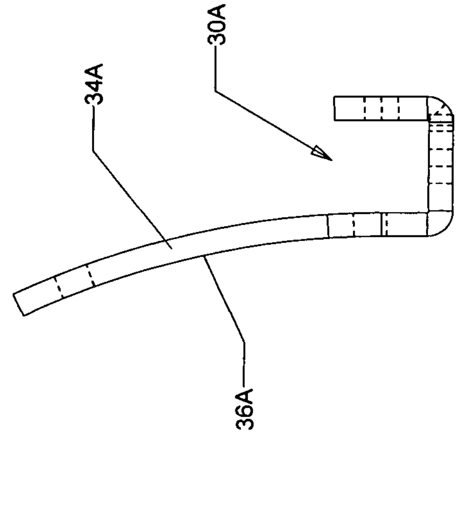
FIG. 5 is a side view of a second embodiment of the brush holder.

The brush holder assembly 16 illustrated in FIGS. 1-4 is arcuately curved away from commutator 26. Due to design limitations or space limitations with respect to a particular electrical device, the housing member 30 of brush holder assembly 16 may require a curvature toward commutator 26 or may require a double curve or S-shape. FIG. 5 illustrates a side profile view of a second embodiment of housing member 30, designated as housing member 30A. It functions identically in the brush holder assembly 16 as housing member 30 with the exception that the paralleledly disposed side wall portions 34A and 36A are curved forward towards commutator 26 (not shown). Still further, in other design limitations or restrictions, it may be necessary to impart a double curvature to housing member 30, this is illustrated in FIG. 6 in which the paralleledly disposed side wall portions 34B and 36B are formed with a double curvature 39 and 41. Again, housing member 30B functions in an identical manner as respects the housing member 30 as illustrated and explained in FIGS. 1-4.

Therefore, while the present invention has been disclosed with respect to the preferred embodiments thereof, it will be recognized by those of ordinary skill in the art that various changes and modifications can be made without departing from the spirit and scope of the invention. It is therefore manifestly intended that the invention be limited only by the claims and the equivalence thereof.

I claim:

1. A brush holder assembly for use in a machine in which electricity is to be transferred between a rotatable conductor and an electrically-conducting brush element with an electrical wire extending there from, said electrically conducting brush element biased to make contact with said rotatable conductor, wherein said brush holder assembly is rigidly mounted on a yolk of said machine which comprises:

a housing member mounted on a yolk, said yolk disposed about a rotatable conductor, said housing formed with a chamber defined by opposing side wall members and upper and lower ends to receive said electrically-conducting brush element, said housing member being arcuate in shape having a curvilinear surface in relationship to said rotatable conductor;

means for supporting said electrically conducting brush element in said brush holder assembly.

2. The brush holder assembly as defined in claim 1 wherein said housing member is arcuate in shape having a curvilinear surface curving away from said rotatable conductor.

3. The brush holder assembly as defined in claim 1 wherein said housing member is arcuate in shape having a curvilinear surface curving toward said rotatable conductor.

4. The brush holder assembly as defined in claim 1 wherein said housing member is arcuate in shape, having a double curvature and being S-shaped in cross section.

5. The brush holder assembly as defined in claim 1 wherein said housing member is formed with outwardly disposed leg portions for connecting said housing member to said yolk.

6. The brush holder assembly as defined in claim 1 wherein said means for supporting said electrically conducting brush element includes a spring member including a body portion and end coil portions wherein said body portion biases said electrically-conducting brush element toward said rotatable conductor.

7. The brush holder assembly as defined in claim 6 wherein said spring member means is a constant force tension spring having an extended travel length.

8. The brush holder assembly as defined in claim 6 wherein a plastic bushing member is integrally disposed in said end coil portion of said spring member, said plastic bushing member formed of a plastic dielectric material.

9. The brush holder assembly as defined in claim 8 wherein said plastic bushing member is cylindrically shaped.

10. The brush holder assembly as defined in claim 1 wherein said rotatable conductor is a commutator.

* * * * *